(12) United States Patent
Ke (10) Patent No.: US 7,991,277 B2
(45) Date of Patent: Aug. 2, 2011

(54) CAMERA MODULE WITH ANTI-SHAKE MECHANISM

(75) Inventor: Chau-Yuan Ke, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 7 days.

(21) Appl. No.: 12/582,811

(22) Filed: Oct. 21, 2009

(65) Prior Publication Data
US 2010/0290768 A1 Nov. 18, 2010

(30) Foreign Application Priority Data
May 15, 2009 (CN) .......................... 2009 1 0302330

(51) Int. Cl.
G03B 17/00 (2006.01)
H04N 5/228 (2006.01)
G02B 27/64 (2006.01)

(52) U.S. Cl. .................. 396/55; 348/208.7; 348/208.11; 359/557

(58) Field of Classification Search ................ 396/52, 396/53, 55, 323, 325, 333, 334; 348/208.99, 348/208.1, 208.2, 208.4, 208.7, 208.11; 359/554, 359/557
See application file for complete search history.

(56) References Cited

U.S. PATENT DOCUMENTS
2002/0176713 A1 * 11/2002 Kai et al. ...................... 396/429
* cited by examiner

*Primary Examiner* — Rochelle-Ann J Blackman
(74) *Attorney, Agent, or Firm* — Raymond J. Chew (57) ABSTRACT

A camera module includes a circuit board, an image sensor mounted on the circuit board, a lens module including a lens, a position sensor, a plurality of electrical wire groups mounted on the lens, and a plurality of magnetic field generators. The lens held a distance from the circuit board by holding wires fixed on the circuit board. The position sensor is mounted on the circuit board and configured for detecting displacements of the lens module and the image sensor relative to the object. The magnetic field generators are arranged adjacent to the respective electrical wire groups, and each configured for generating a magnetic field for allowing the electrical wire groups together with the lens to move to give a correction of the displacements of the lens, such that an image of an object is projected at a predetermined region of the image sensor.

20 Claims, 7 Drawing Sheets

CAMERA MODULE WITH ANTI-SHAKE MECHANISM

CROSS-REFERENCE TO RELATED APPLICATION

This application is related to a commonly-assigned co-pending application entitled "CAMERA MODULE HAVING ANTI-SHAKE MECHANISM". The above-identified application is filed simultaneously with the present application. The disclosure of the above-identified application is incorporated herein by reference.

BACKGROUND

1. Technical Field

The present disclosure relates to camera modules, and particularly, to an anti-shake camera module.

2. Description of Related Art

Lens modules and image sensors are key components of camera modules. In normal use of a camera module, light rays coming from an object transmit through the lens module along a predetermined path and fall on a central region of the image sensor. That is, an image plane of the object is precisely on the image sensor, and thus a clear image is obtained. However, inadvertent shaking of the camera module may occur during the time that an image is captured. When this happens, either or both of the lens module and the image sensor may move slightly relative to the object. In such case, the light rays from the object may not accurately fall on the image sensor. That is, the image plane of the object may not be precisely on the image sensor, resulting in a blurry image.

Anti-shake mechanisms that use motors have been devised to overcome these problems. In a typical anti-shake mechanism, the motor moves the image sensor to the image plane of the object. However, in general, motors are bulky and consume a great deal of electrical energy. In particular, the image sensor may have to be driven again and again each time image capturing is performed.

What is needed, therefore, is a camera module which can avoid or overcome the above-described shortcomings.

BRIEF DESCRIPTION OF THE DRAWINGS

Many aspects of the present camera module can be better understood with reference to the following drawings. The components in the drawings are not necessarily drawn to scale, the emphasis instead being placed upon clearly illustrating the principles of the present camera module. Moreover, in the drawings, all the views are schematic, and like reference numerals designate corresponding parts throughout the several views.

DETAILED DESCRIPTION OF EMBODIMENTS

Embodiments of the present camera module will now be described in detail below and with reference to the drawings.

Figure 1:
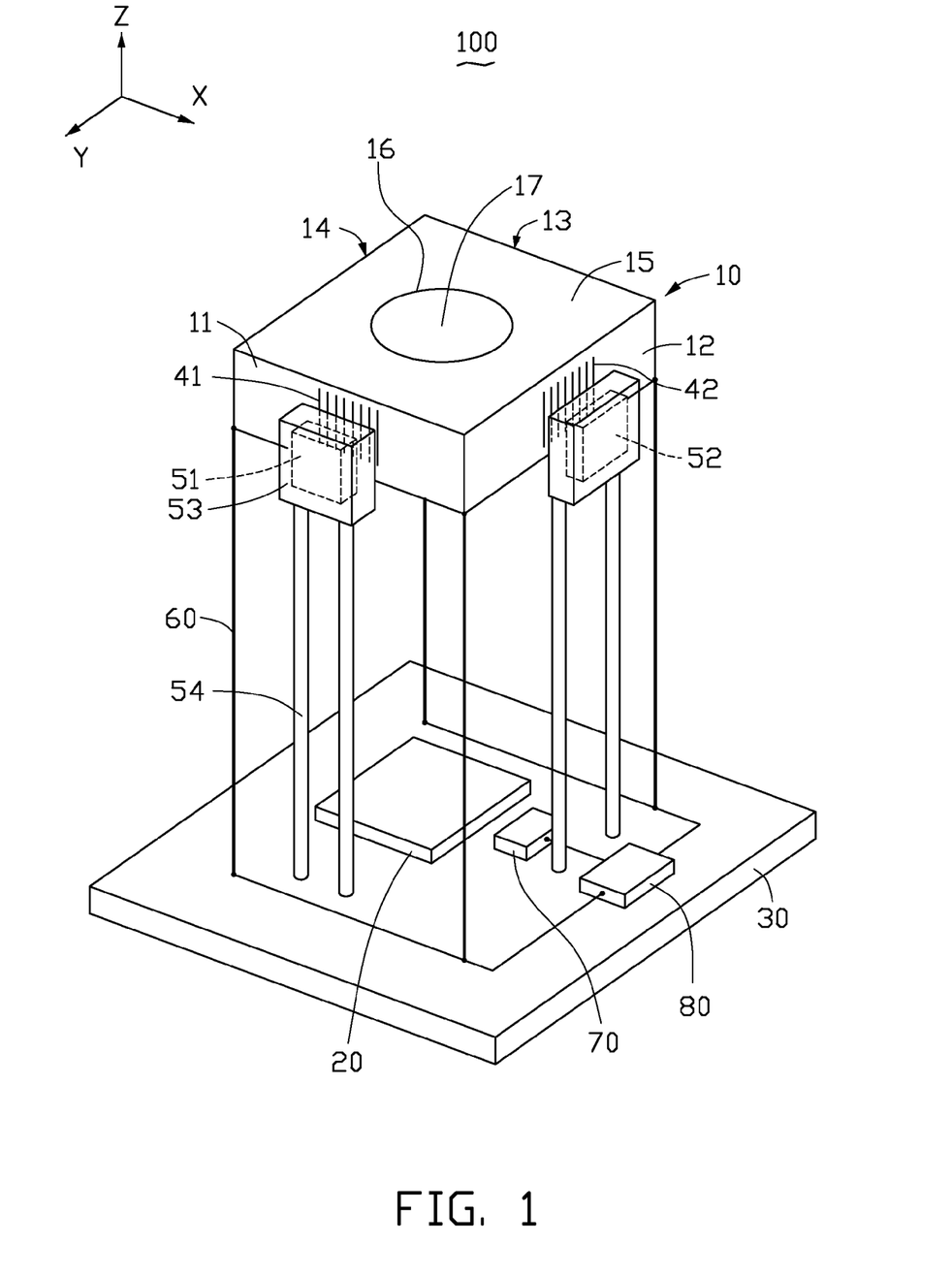
FIG. 1 is an isometric view of a camera module in accordance with a first embodiment.

Referring to FIG. 1, an exemplary camera module 100 in accordance with a first embodiment is shown. The camera module 100 mainly includes a lens module 10, an image sensor 20, a circuit board 30, a position sensor 70, a controller 80, a first electrical wire group 41, a second electrical wire group 42, a first magnetic field generator 51, and a second magnetic field generator 52.

The lens module 10 includes a lens-holder 15 having a through hole 16, and a lens 17 received in the through hole 16. In the present embodiment, the lens-holder 15 is substantially rectangular, and the through hole 16 is round. The lens-holder 15 has four sidewalls 11, 12, 13, and 14. The sidewall 11 is adjacent and perpendicular to the sidewall 12. The lens module 10 is held a distance from the circuit board 30 by four holding wires 60 which are fixed to the circuit board 30. When the camera module 100 is in a state in which no anti-shake function is performed, the holding wires 60 are parallel to each other, and parallel to an optical axis of the lens module 10. The optical axis is parallel to a Z axis of a Cartesian coordinate system, as illustrated. The holding wires 60 are stiff, but have some resiliency. The holding wires 60 can for example be made of metal. The flexibility of the holding wires 60 allows movement of the lens module 10 along an XY plane, which is perpendicular to the Z axis.

The first electrical wire group 41 is fixedly mounted to the sidewall 11, and the second electrical wire group 42 is fixedly mounted to the sidewall 12. In the present embodiment, the first and second electrical wire groups 41, 42 each include a number of straight electrical wires, which are parallel to each other. The first magnetic field generator 51 is arranged adjacent to the first electrical wire group 41, and the second magnetic field generator 52 is arranged adjacent to the second electrical wire group 52. Each of the first and second magnetic field generators 51, 52 is supported by two poles 54, which are fixed to the circuit board 30. Enclosures 53 may be provided on the first and second magnetic field generators 51, 52, to avoid electromagnetic interference occurring to the image sensor 20. Gaps (not labeled) are maintained between the first and second electrical wire groups 41, 42 and the respective first and second magnetic field generators 51, 52, for allowing the lens module 10 to be movable along the XY plane.

Each of the first and second magnetic field generators 51, 52 is configured for generating a magnetic field around the respective first or second electrical wire group 41, 42. In the present embodiment, the magnetic field generated by each of the first and second magnetic field generators 51, 52 is a fixed magnetic field. Preferably, the direction of the magnetic field generated by each of the first and second magnetic field generators 51, 52 is perpendicular to the plane in which the respective first or second electrical wire group 41, 42 is oriented. In an alternative embodiment, the direction of the magnetic field generated by each of the first and second magnetic field generators 51, 52 can be parallel to the plane in which the respective first or second electrical wire group 41, 42 is oriented. Each of the first and second magnetic field generators 51, 52 can be a permanent magnet, or an electromagnet.

The image sensor 20, the position sensor 70, and the controller 80 are mounted on the circuit board 30. The position sensor 70 is capable of detecting motions of the lens module 10 and the image sensor 20. The controller 80 is connected to the position sensor 70, and may be electrically connected to the first and second electrical wire groups 41, 42 by circuits (not labeled) on the circuit board 30 and within the holding wires 60. The controller 80 is configured for applying current to the first and second electrical wire groups 41, 42 and controlling the magnitude, direction, and duration of the current based on the motions of the lens module 10 and the image sensor 20.

When shaking of the entire camera module 100 occurs, the shaking may for example lead to motions of the entire camera module 100 in directions along the X, Y, and Z axes. In general, motion along the Z axis does not impact image quality, because the distance between the lens module 10 and the image sensor 20 is fixed. As such, only corrections to motions occurring along the X and Y axes are needed. According to the Left Hand Principle, when current is applied to the first and second electrical wire groups 41, 42, the first and second electrical wire groups 41, 42 are subject to Ampere's forces along four different directions in the XY plane, depending on the direction of the current in each of the first and second electrical wire groups 41, 42. In particular, for the first electrical wire group 41, the Ampere's forces may operate in positive or negative X directions. For the second electrical wire group 42, the Ampere's forces may operate in positive or negative Y directions. In this way, the first and second electrical wire groups 41, 42 are capable of being selectively moved along the four axial directions in the XY plane, and the first and second electrical wire groups 41, 42 accordingly move the lens module 10 along selected of the four axial directions in the XY plane simultaneously. When the current is switched off, the lens module 10 can return to an original position due to the resilient flexibility of the holding wires 60.

Figure 2:
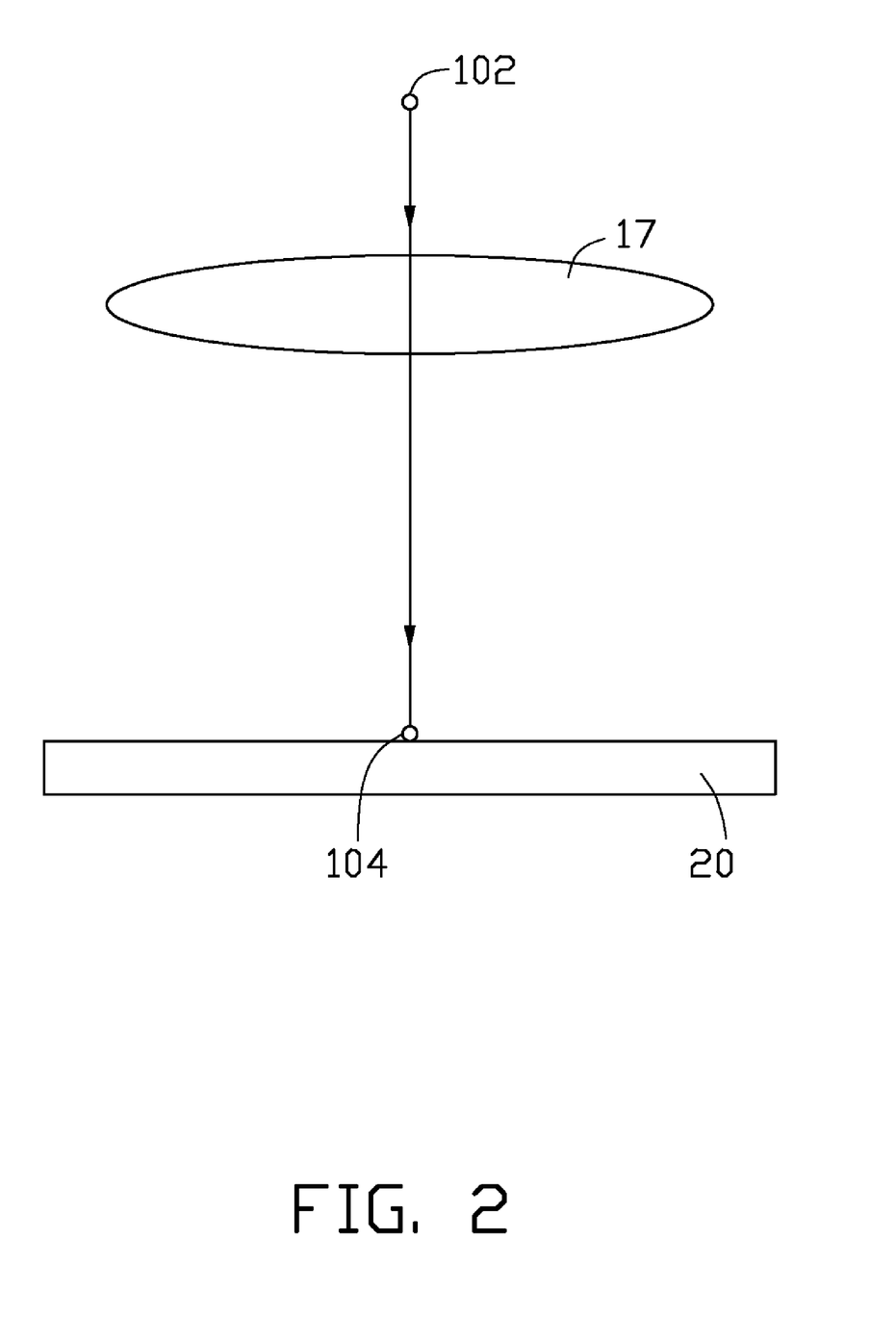
FIG. 2 is a side plan view showing a light path in a normal state of a lens and an image sensor of the camera module of FIG. 1 relative to an object.

Referring to FIG. 2, in a normal image capturing state, an exemplary light ray transmits from an object 102 through the lens 17 onto a central region of the image sensor 20, and forms an image 104 on the image sensor 20. In this state, the controller 80 does not need to apply current to the first or second electrical wire groups 41, 42.

Figure 3:
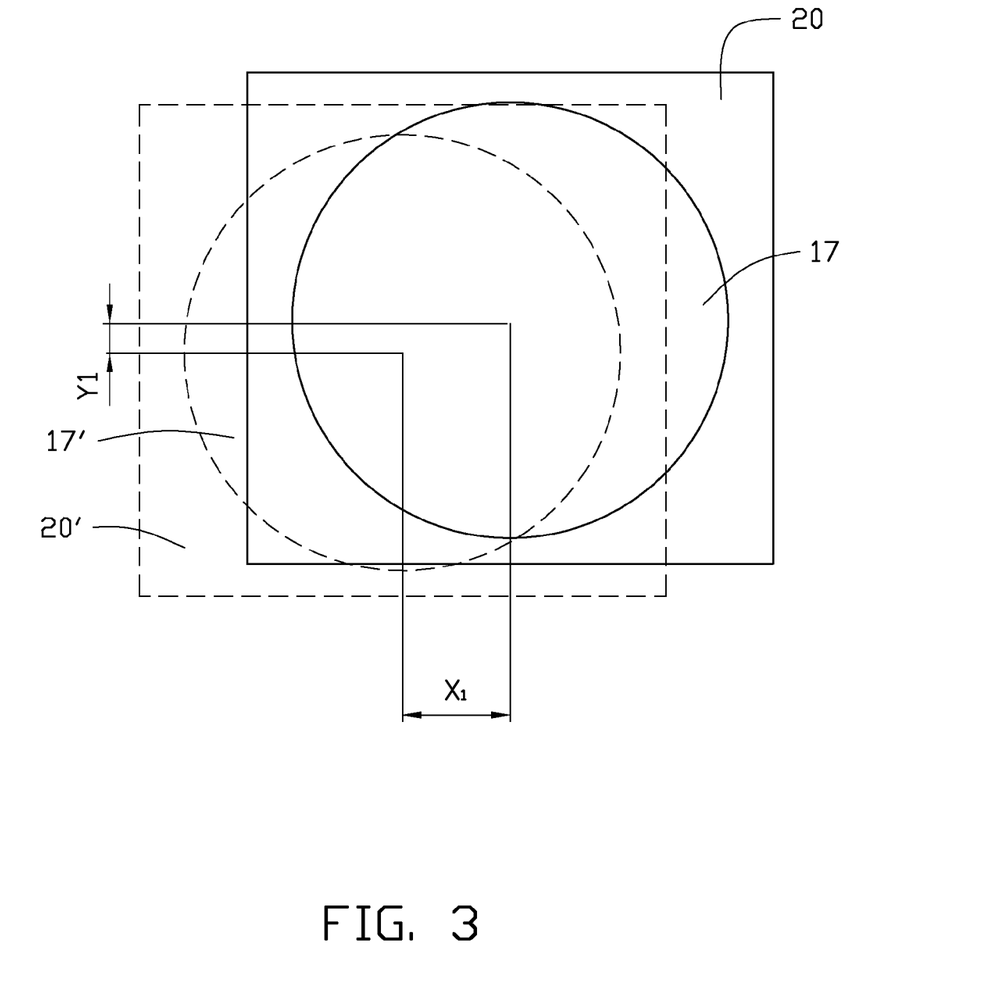
FIG. 3 is a top plan view showing displacement of the lens and the image sensor relative to the object due to shaking of the camera module.
Figure 4:
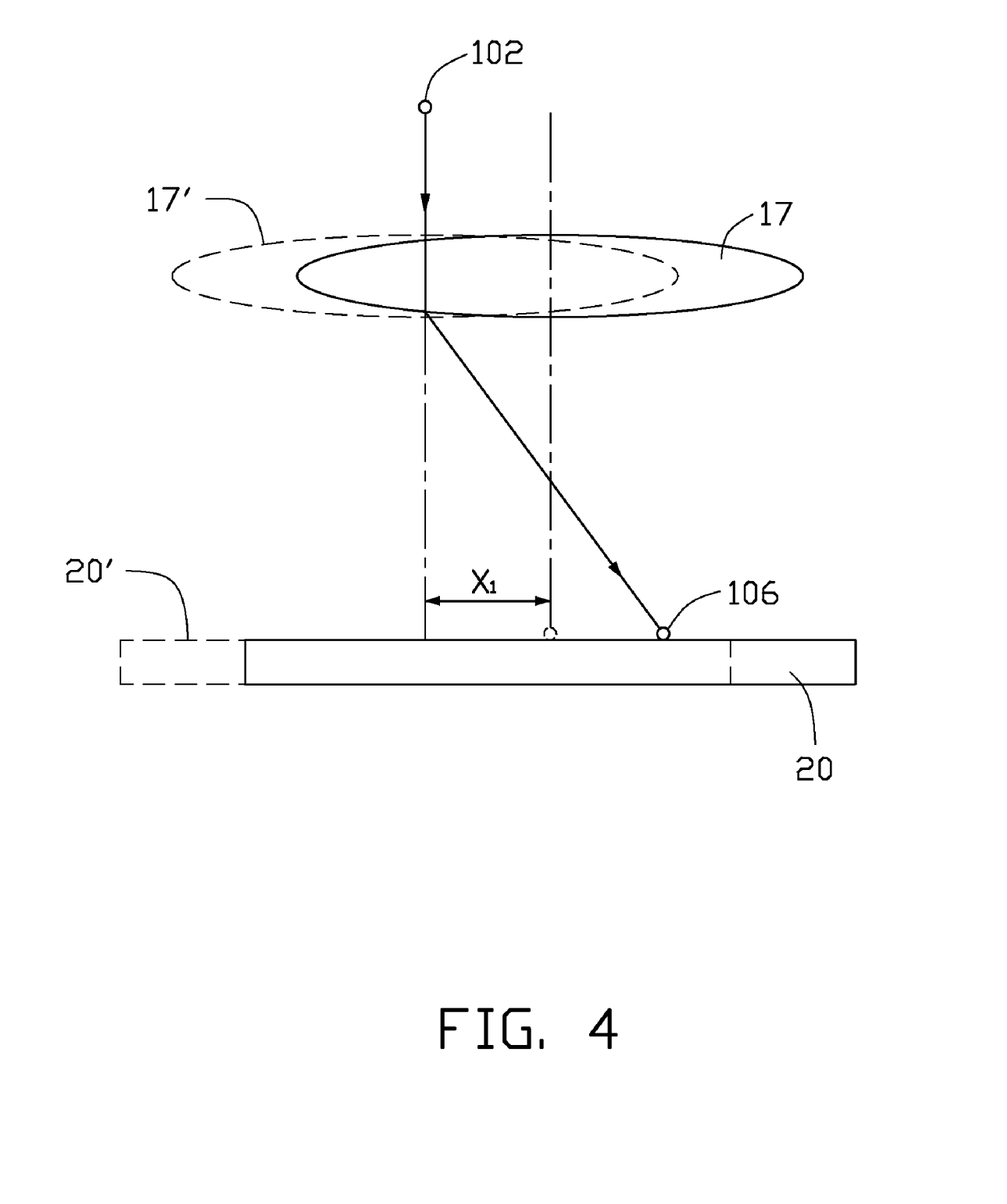
FIG. 4 is a side plan view corresponding to FIG. 3, showing the light path of FIG. 2 deviated by the displacement of the lens and the image sensor.

Referring to FIGS. 3 and 4, in this example, shaking of the camera module 100 occurs, and the lens 17 and the image sensor 20 are displaced from their respective original positions 17', 20'. For example, each of the lens 17 and the image sensor 20 is displaced a distance X1 along the positive direction of the X axis, and a distance Y1 along the negative direction of the Y axis. In this state, if no correction were made to the displacement of the lens 17 or the displacement of the image sensor 20, the exemplary light ray from the object 102 would fall on a region of the image sensor 20 different from the central region, and form a blurry image 106 on the image sensor 20.

Figure 5:
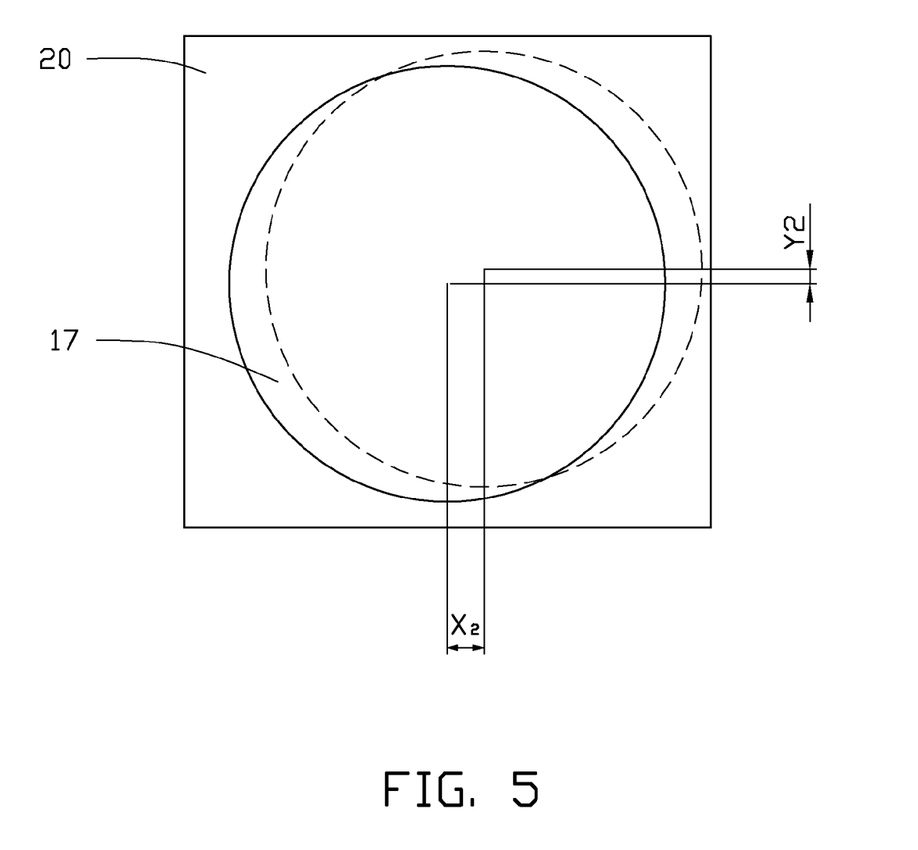
FIG. 5 is similar to FIG. 3, but showing correction of the displacement of the lens.
Figure 6:
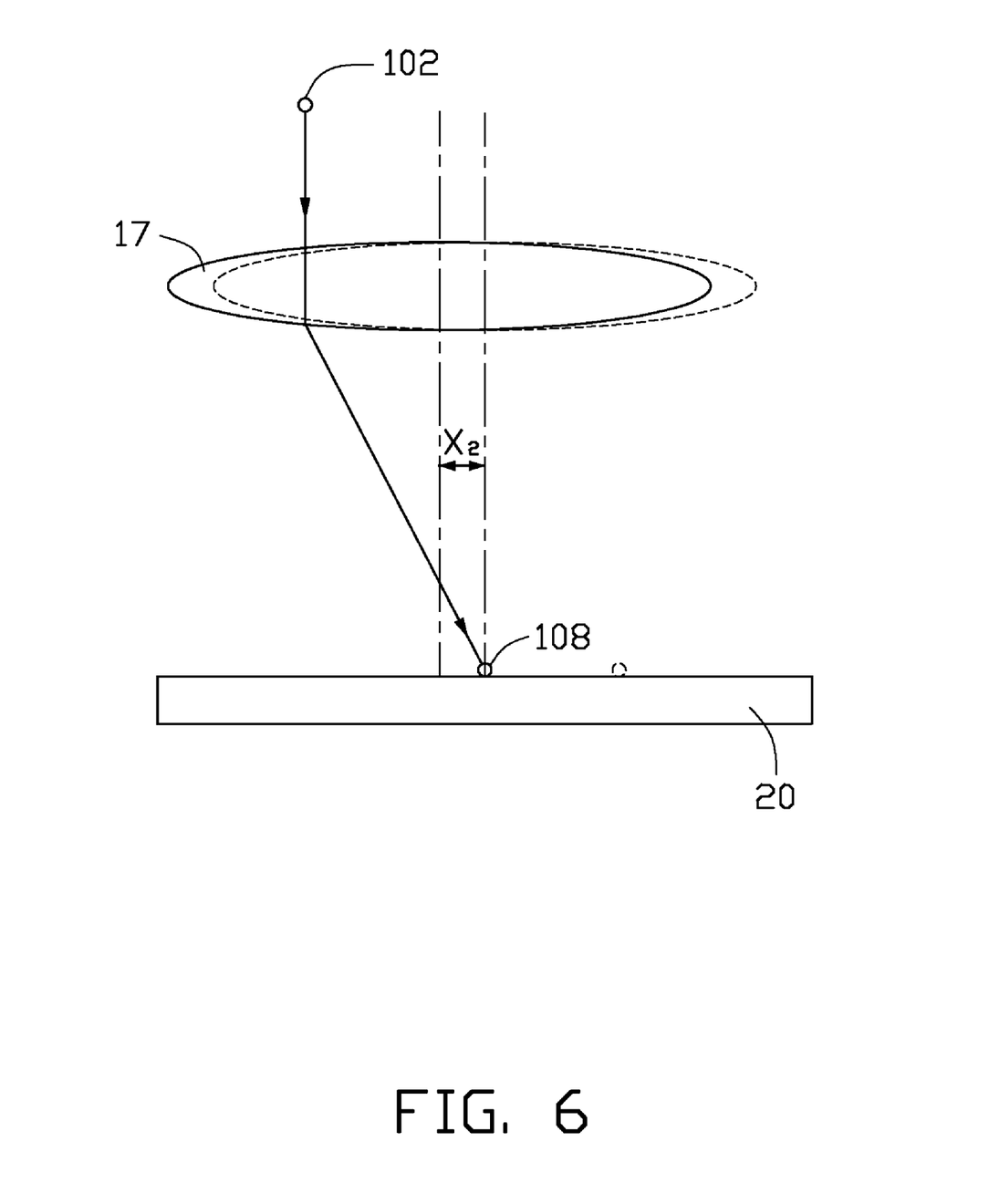
FIG. 6 is a side plan view corresponding to FIG. 5, showing correction of the deviated light path of FIG. 4.

Referring to FIGS. 5 and 6, in this example, corrections to the displacement of the lens 17 are made. The lens 17 is moved back a distance X2 along the negative direction of the X axis, and back a distance Y2 along the positive direction of the Y axis. Thus, the optical light path of the exemplary light ray from the object 102 is compensated. In this way, the exemplary light ray from the object 102 falls on the central region of the image sensor 20, and forms an image 108. The position of the image 108 is similar to or substantially the same as the position of the image 104. Thus the exemplary light ray of the object 106 can still be correctly and clearly projected onto the central region of the image sensor 20 in spite of the shaking. In this way, the anti-shake function is achieved.

In other embodiments, other lens modules may be added to the camera module 100. If the other lens modules are movable along the illustrated Z axis relative to the image sensor 20, the entire camera module 100 can have a zoom function.

Figure 7:
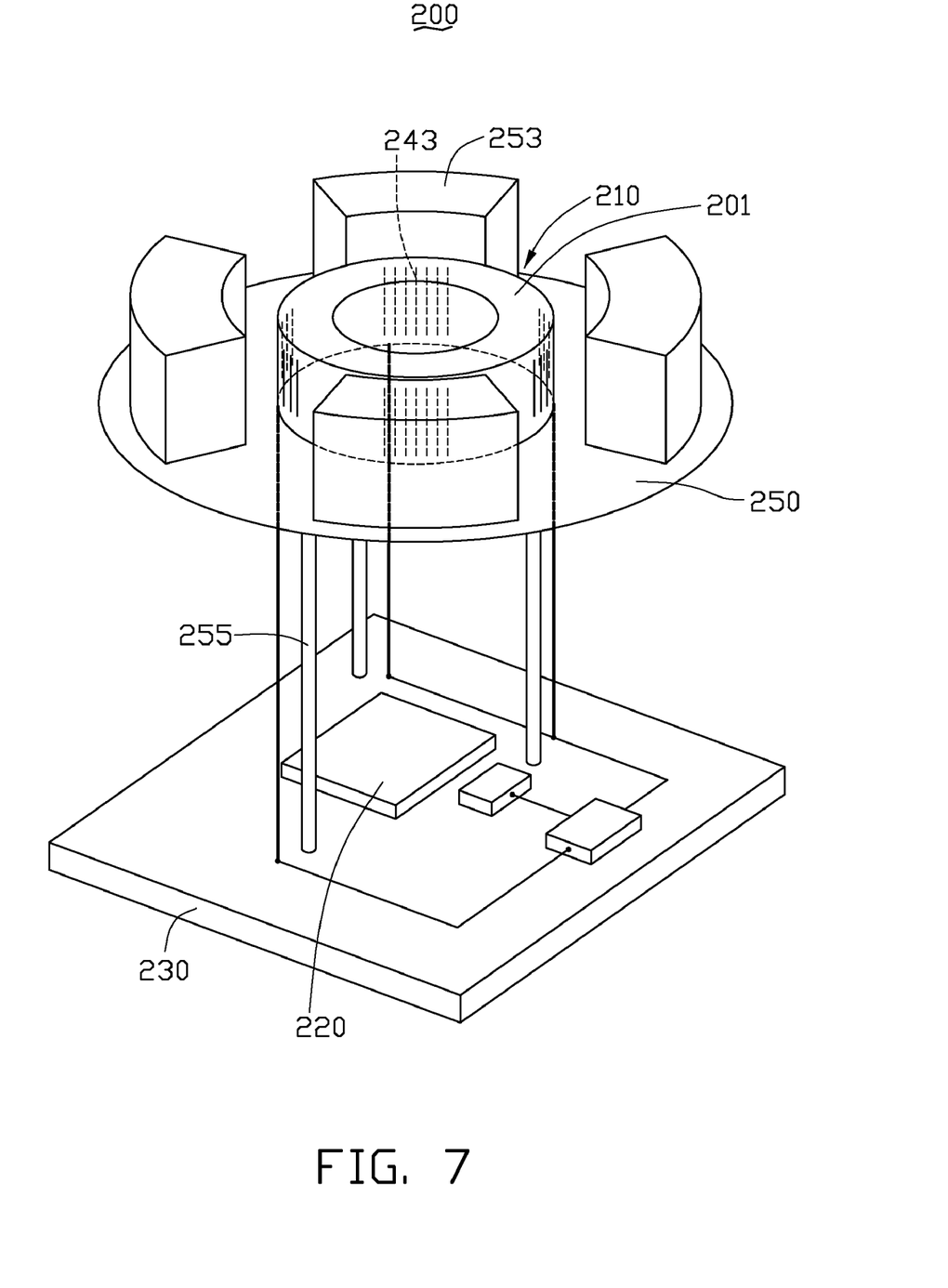
FIG. 7 is an isometric view of a camera module in accordance with a second embodiment.

Referring to FIG. 7, an exemplary camera module 200 in accordance with a second embodiment is shown. The camera module 200 is essentially similar to the camera module 100 described above. However, a lens module 210 has a cylindrical (or annular) lens-holder 201, and four electrical wire groups 243 are mounted on four side portions of the lens-holder 201. The electrical wire groups 243 are equally angularly spaced from each other on the outside of the lens-holder 201. Two of the electrical wire groups 243 are arranged symmetrically opposite each other across a center of the lens-holder 201. The other two electrical wire groups 243 are arranged symmetrically opposite each other across the center of the lens-holder 201. Four generally arc-shaped magnetic field generators 253 are provided on a ring-shaped metallic plate 250. The magnetic field generators 253 are equally angularly spaced from each other around the outside of the lens-holder 201. Two of the magnetic field generators 253 are arranged symmetrically opposite each other across the center of the lens-holder 201. The other two magnetic field generators 253 are arranged symmetrically opposite each other across the center of the lens-holder 201. The magnetic field generators 253 face the electrical wire groups 243, respectively. The metallic plate 250 is supported by three poles 255, which are fixed to a circuit board 230. The metallic plate 250 is also configured for separating and isolating the magnetic field generators 253 from an image sensor 220. Thus electromagnetic interference occurring to the image sensor 220 can be avoided.

In an alternative embodiment, a ring-shaped magnetic field generator can replace the magnetic field generators 253. In other alternative embodiments, another kind of device can replace the magnetic field generators 253; as long as the device provides at least one magnetic field having a direction perpendicular to a plane in which each of the electrical wire groups 243 is substantially oriented, respectively.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A camera module for capturing an image of an object, the camera module comprising:
   a circuit board;
   an image sensor mounted on the circuit board;
   a lens module comprising a lens, the lens module held a distance from the circuit board by a plurality of holding wires fixed on the circuit board;
   a position sensor mounted on the circuit board and configured for detecting displacements of the lens module and the image sensor relative to the object;
   a plurality of electrical wire groups mounted on the lens module; and
   a plurality of magnetic field generators held a distance from the circuit board and arranged adjacent to the electrical wire groups, respectively, each magnetic field generator configured for applying a magnetic field to the corresponding electrical wire group, each of the electrical wire groups being electrifiable in response to detection by the position sensor of displacement of at least one of the lens module and the image sensor relative to the object such that at least one of the electrical wire groups and the corresponding magnetic field generator cooperatively drive the lens module to move and compensate the displacement of at least one of the lens module and the image sensor relative to the object such that an image of the object is captured at a central region of the image sensor.

2. The camera module as described in claim 1, wherein the plurality of electrical wire groups comprises a first electrical wire group and a second electrical wire group, and the plurality of magnetic field generators comprises a first magnetic field generator arranged adjacent to the first electrical wire group and configured for providing a first magnetic field, and a second magnetic field generator arranged adjacent to the second electrical wire group and configured for providing a second magnetic field, and when the first electrical wire group is electrified, the first electrical wire group is driven in the first magnetic field and moves the lens module in either of two opposite first component directions, and when the second electrical wire group is electrified, the second electrical wire group is driven in the second magnetic field and moves the lens module in either of two opposite second component directions.

3. The camera module as described in claim 2, wherein the first component directions are substantially perpendicular to the second component directions, and the first and second component directions are all oriented in a plane substantially perpendicular to an optical axis of the lens module.

4. The camera module as described in claim 2, wherein movement of the lens module in either of the two opposite first component directions is achieved by changing the direction of electrical current applied to the first electrical wire group, and movement of the lens module in either of the two opposite second component directions is achieved by changing the direction of electrical current applied to the second electrical wire group.

5. The camera module as described in claim 1, wherein each of the holding wires is stiff but resilient, and each of the holding wires is substantially parallel to an optical axis of the lens module when none of the electrical wire groups is electrified.

6. The camera module as described in claim 1, further comprising a controller electrically connected to the position sensor and the electrical wire groups, the controller being configured for adjusting at least one of a magnitude, a direction, and a period of time of application of an electrical current applied to at least one of the electrical wire groups at any one time, based on the detection by the position sensor of displacement of at least one of the lens module and the image sensor relative to the object.

7. The camera module as described in claim 6, wherein the controller is electrically connected the electrical wire groups by circuits arranged on the circuit board and within the holding wires.

8. The camera module as described in claim 1, wherein each of the electrical wire groups comprises a plurality of straight electrical wires.

9. The camera module as described in claim 1, wherein the magnetic field generators are supported by a plurality of poles fixed to the circuit board.

10. The camera module as described in claim 1, wherein the lens module further comprises a hollow lens-holder for receiving the lens therein, and the holding wires and the electrical wire groups are mounted on the lens-holder.

11. The camera module as described in claim 10, wherein the lens-holder is generally rectangular and has four sides, the plurality of electrical wire groups comprise two electrical wire groups, and the electrical wire groups are mounted to adjacent sides of the lens-holder, respectively.

12. The camera module as described in claim 10, wherein the lens-holder is cylindrical, and two of the electrical wire groups are arranged symmetrically opposite each other across a center of the lens-holder.

13. The camera module as described in claim 12, further comprising a metallic plate configured for supporting the magnetic field generators and isolating the magnetic field generators from the image sensor.

14. The camera module as described in claim 1, further comprising a plurality of enclosures attached to the magnetic field generators, respectively, the enclosures configured for blocking the magnetic field generators from causing electromagnetic interference to other parts of the camera module.

15. A camera module for capturing an image of an object, the camera module comprising:
a circuit board;
an image sensor mounted on the circuit board;
a lens module held in spaced relation to the circuit board by a plurality of holding wires fixed on the circuit board;
a position sensor mounted on the circuit board and configured for detecting displacement of at least one of the lens module and the image sensor relative to the object;
a first electrical wire group and a second electrical wire group mounted on the lens module;
a controller electrically connected to the position sensor and the first and second electrical wire groups, the controller being configured for automatically applying electrical current to at least one of the first and second electrical wire groups based on the detected displacement of at least one of the lens module and the image sensor;
a plurality of magnetic field generators held a distance from the circuit board and arranged adjacent to the first and second electrical wire groups; and
a plurality of enclosures attached to the magnetic field generators and configured for blocking the magnetic field generators from causing electromagnetic interference to other parts of the camera module, wherein the first electrical wire group in unison with the lens module and the second electrical wire group is movable in the magnetic field of one of the magnetic field generators along either of two opposite first component directions under a condition that electrical current is applied to the first electrical wire group, and the second electrical wire group in unison with the lens module and the first electrical wire group is movable in the magnetic field of one of the magnetic field generators along either of two opposite second component directions under a condition that electrical current is applied to the second electrical wire group, thereby physically correcting the displacement of at least one of the lens module and the image sensor such that an image of the object captured by the image sensor is optically corrected.

16. The camera module as described in claim 15, wherein the first component directions are substantially perpendicular to the second component directions, and the first and second component directions are all oriented in a plane substantially perpendicular to an optical axis of the lens module.

17. The camera module as described in claim 15, wherein each of the holding wires is stiff but resilient, and each of the holding wires is substantially parallel to an optical axis of the lens module when none of the electrical wire groups is electrified.

18. A camera module for capturing an image of an object, the camera module comprising:
a circuit board;
an image sensor mounted on the circuit board;
a lens module held in spaced relation to the circuit board by a plurality of holding wires fixed on the circuit board;
a position sensor mounted on the circuit board and configured for detecting displacement of at least one of the lens module and the image sensor relative to the object;
a first electrical wire group and a second electrical wire group mounted on the lens module;
a controller electrically connected to the position sensor and the first and second electrical wire groups, the controller being configured for automatically applying electrical current to at least one of the first and second electrical wire groups based on the detected displacement of at least one of the lens module and the image sensor;
at least one magnetic field generator held a distance from the circuit board and arranged adjacent to the first and second electrical wire groups; and
a metallic plate held a distance from the circuit board by a plurality of poles and supporting the at least one magnetic field generator, the metallic plate configured for isolating the at least one magnetic field generator from the image sensor, wherein the first electrical wire group in unison with the lens module and the second electrical wire group is movable in the magnetic field of one of the at least one magnetic field generator along either of two opposite first component directions under a condition that electrical current is applied to the first electrical wire group, and the second electrical wire group in unison with the lens module and the first electrical wire group is movable in the magnetic field of one of the magnetic field generators along either of two opposite second component directions under a condition that electrical current is applied to the second electrical wire group, thereby physically correcting the displacement of at least one of the lens module and the image sensor such that an image of the object captured by the image sensor is optically corrected.

19. The camera module as described in claim 18, wherein the first component directions are substantially perpendicular to the second component directions, and the first and second component directions are all oriented in a plane substantially perpendicular to an optical axis of the lens module.

20. The camera module as described in claim 18, wherein each of the holding wires is stiff but resilient, and each of the holding wires is substantially parallel to an optical axis of the lens module when none of the electrical wire groups is electrified.

* * * * *